(12) United States Patent
Chan et al.

(10) Patent No.: US 6,697,456 B2
(45) Date of Patent: Feb. 24, 2004

(54) SPEECH ANALYSIS BASED ANSWER DETECTION FOR IP BASED TELEPHONES

(75) Inventors: Norman Chin-Hung Chan, Louisville, CO (US); Gary Ray Becker, Northglenn, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 77 days.

(21) Appl. No.: 10/013,048

(22) Filed: Dec. 7, 2001

(65) Prior Publication Data

US 2003/0108157 A1 Jun. 12, 2003

(51) Int. Cl.⁷ .............................................. H04M 1/64
(52) U.S. Cl. ................... 379/88.03; 379/88.04; 704/275; 370/352
(58) Field of Search .................. 379/88.01–88.04, 379/88.07–88.1, 88.16–88.18, 88.22, 88.23; 370/351–356, 392; 704/231, 246, 251, 275

(56) References Cited

U.S. PATENT DOCUMENTS

| | | | | |
|---|---|---|---|---|
| 5,594,784 A | * | 1/1997 | Velius | 379/88.02 |
| 5,668,854 A | * | 9/1997 | Minakami et al. | 379/88.18 |
| 5,787,152 A | * | 7/1998 | Freadman | 379/88.01 |
| 5,924,046 A | * | 7/1999 | Martensson | 455/567 |
| 6,449,269 B1 | * | 9/2002 | Edholm | 370/352 |
| 6,453,020 B1 | * | 9/2002 | Hughes et al. | 379/88.04 |
| 6,470,077 B1 | * | 10/2002 | Chan | 379/88.01 |
| 2002/0051188 A1 | * | 5/2002 | Kim | 358/1.15 |
| 2002/0071424 A1 | * | 6/2002 | Chiu et al. | 370/352 |

\* cited by examiner

*Primary Examiner*—Roland G. Foster
(74) *Attorney, Agent, or Firm*—John C. Moran

(57) ABSTRACT

Speaking a predetermined phrase by a user, causes a handset to transmit this audio information to a personal computer. The personal computer is responsive to the predefined phrase to determine that the user of the handset has answered an incoming call.

18 Claims, 6 Drawing Sheets

SPEECH ANALYSIS BASED ANSWER DETECTION FOR IP BASED TELEPHONES

TECHNICAL FIELD

This invention relates to telephones in general and, in particular, two or more telephones communicating using an IP protocol.

BACKGROUND OF THE INVENTION

An IP softphone consists of a software package running on a personal computer (PC). An example of such an IP softphone is the Avaya IP Softphone manufactured by Avaya Inc. The software emulates a telephone and communicates signaling and voice information via a IP-network connection between the PC and a telecommunication switching system (also referred to as a PBX). This network connection is often the Internet or a LAN. Audio information being received from the network is communicated with the user via a headset or handset via a sound card that interfaces the headset or handset to the PC. When a user speaks, the sound card converts the analog information into digital information that the software then transmits to a destination via the network. When a call is received via the network for the IP softphone, the software alerts the user via an internal or external speaker attached to the PC. The user then answers the call by selecting the softphone software application and selecting a soft button labeled "answer". The user then conducts a conversation with the caller via either the handset or the headset. To place a call, the user once again selects the software and selects a soft button labeled "Number" and proceeds to dial the destination number using a keypad or a pre-stored list of telephone numbers. The keypad can by either a soft keypad or the PC's keyboard.

A common problem is that while a user is walking into their office, they then hear the IP softphone ringing. To answer the call, the user must unlock the screen blanker to access the PC, select the software application, and actuate the soft button labeled "answer". Then, the user can pick up the handset or the headset and talk. The problem is that a great amount of time is involved in performing these steps. Frequently, before the user has completed the steps, the call is transferred to coverage such as a voice mail system.

An apparently obvious solution would be to have a switch in the handset that was activated when the handset was picked up to answer the call. However, the vast majority of sound cards do not have a physical input that can sense a switch. One solution that has been utilized is in the Microsoft Netmeeting application. Microsoft Netmeeting attempts to solve this problem by having an option referred to as "call, automatically accept calls". Utilizing this option, a user need only start listening and talking in order to participate in the call. The disadvantage of this option is that a call is always answered whether or not the user is available or not. This leads to a great deal of frustration for callers if the user is not there. Further, at times, the called party may simply not want to answer the call at a particular time.

SUMMARY OF THE INVENTION

This invention is directed to solving these and other problems and disadvantages of the prior art. According to an embodiment of the invention, when a user speaks a predetermined phrase, a handset transmits this audio information to a personal computer. The personal computer is responsive to the predefined phrase to determine that the user of the handset has answered an incoming call. The predefined phrase is not transmitted to the calling party. The user of the handset trains the personal computer to recognize not only the predefined phrase but also the user's voice. Advantageously, this training prevents unauthorized use of the IP softphone. In addition, the personal computer advantageously is capable of utilizing user-independent predefined phrases such that any individual can use the IP softphone. The use of user-independent predefined phrases does allow unauthorized use of the IP softphone.

Advantageously, the first predefined phrase spoken by the user to answer an incoming call is subsequently transmitted to the calling party. The first phrase is initially delayed by the personal computer before it is transmitted to the calling party; however, the transmission of the first phrase to the calling party is accelerated so as not to delay the conversation. Advantageously, the user can utilize one of predefined audio segments to end a call. Predefined audio segments are second predefined phrases and predefined sounds. The personal computer is trained to recognize these second phrases or sounds. These second phrases can be user-independent predefined phrases such that any individual can use the IP softphone. Advantageously, a predefined sound can be that made when a headset or handset is returned to its stationary position.

These and other advantages and features of the present invention will become apparent from the following description of an illustrative embodiment of the invention taken together with the drawing.

DETAILED DESCRIPTION

Figure 1:
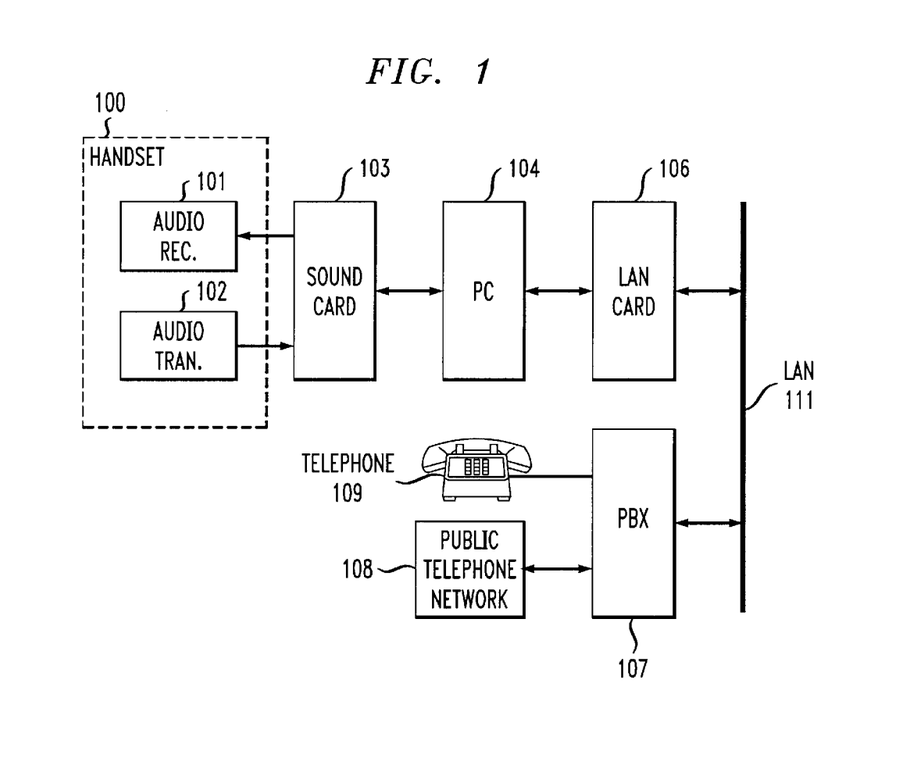
FIG. 1 illustrates, in block diagram form, a system for utilizing the present invention.

FIG. 1 illustrates a system for implementing the invention. In FIG. 1, PBX 107 is supplying telephone service for a user that is utilizing handset 100 via sound card 103, personal computer (PC) 104, LAN card 106 and LAN 111. PBX 107 supplies access to the general public by being interconnected to public telephone network 108. One skilled in the art would readily see that LAN card 106 and sound card 103 could be internal to PC 104. PBX 107 can advantageously be an Avaya Definity® Business Communication Switching System. Whereas a PBX is illustrated in FIG. 1, one skilled in the art would readily envision that PBX 107 could be any of a variety of switching equipment. For example, PBX 107 could be a public switching telephone network (PSTN) gateway box in an H.323 calling system. PBX 107 supplies service for other users utilizing conventional telephones such as telephone 109. In addition, other handsets similar to handset 100 can be interconnected to LAN 111 by having individual sound cards, PCs and LAN cards. PC 104 receives control signaling and voice information from PBX 107, and PC 104 in turn transmits voice information and control signaling information to PBX 107 via LAN card 106 and LAN 111. Sound card 103 performs the function of converting audio information received from PC 104 to analog signals and transmitting these to audio receiver 101 that advantageously can be a simple speaker arranged in handset 100. Sound card 103 similarly converts audio information from audio transmitter 102 (that advantageously can be a simple microphone) to digital information, which is transmitted to PC 104. A software application in PC 104 (audio client 202) provides the facilities for analyzing the speech of the user of the IP softphone to determine call acceptance and termination. The user of the IP softphone trains audio client 202 for these phrases. In addition, the user of the IP softphone can choose to use standard, user-independent predefined phrases. In utilizing the user-independent predefined phrases, the user does lose the ability to prevent unauthorized use of the IP softphone. In the second embodiment, audio client 202 performs the necessary acceleration of the transmission of the speech for the predefined phrase that accepts an incoming call. Other software applications in PC 104 emulate a telephone such as telephone 109 with respect to PBX 107 with the exception that PBX 107 is transmitting and receiving information via LAN 111 rather than a telephone link. Sound card 103, PC 104, and LAN card 106 are of a conventional design well-known to those skilled in the art.

Consider the following example of an embodiment of the invention. If telephone 109 places a call to handset 100, PBX 107 transmits control signaling information to PC 104. Softphone application 204 of FIG. 2 of PC 104 then provides an audio alerting sound via an internal or external speaker of PC 104 or other apparatus well-known to those skilled in the art. In addition, softphone application 204 transmits control information to audio client 202 that causes audio client 202 to perform the speech analysis operation for first predefined phrases that will be received via audio transmitter 102 via sound card 103 from the user of handset 100. Advantageously, a first predefined phrase could be "off hook". When the user of handset 100 speaks the first predefined phrase, audio client 202 detects the presence of the first predefined phrase and alerts softphone application 204 to this fact. In response, softphone application 204 transmits control information back to PBX 107 indicating that the call has been answered by handset 100. The telephone conversation then takes place in a normal manner by the user of handset 100 hearing speech from the user of telephone 109 via audio receiver 101 and speaking to the user of telephone 109 via audio transmitter 102. When softphone application 204 transmits control information back to PBX 107 indicating that the call has been disconnected, a manual disconnect operation by the user has been detected or a predefined second phrase or sound. This fact is transmitted as control information to PBX 107 by softphone application 204 indicating that the call has been disconnected, and PBX 107 responds in a normal manner. The user performs a manual disconnect operation by selecting a soft button labeled "disconnect".

Figure 2:
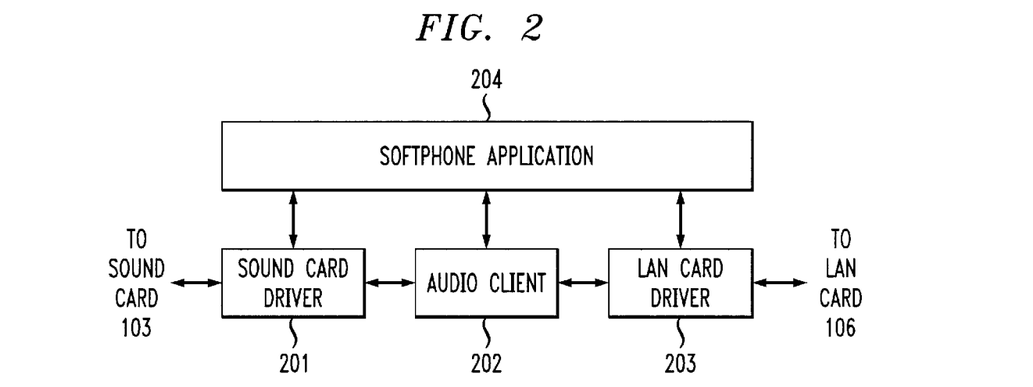
FIG. 2 illustrates, in block diagram form, a software structure for utilizing the present invention.

FIG. 2 illustrates, in block diagram form, the structure of the software within PC 104 utilized to provide the functions for handset 100. The messages transmitted among the software elements 201–204 are conveyed via a standard operating system not illustrated in FIG. 2. Drivers 201 and 203 provide the standard software interface to sound card 103 and LAN card 106, respectively. Such drivers are well-known to those skilled in the art. Softphone application 204 provides the overall control not only of the communication of calls with PBX 107 but also control over the functions of audio client 202. When the control information is received from PBX 107 indicating that there is an incoming call, this information is relayed from LAN card driver 203 to softphone application 204. Softphone application 204 then initiates sound card driver 201 to produce a ringing sound on the internal or external speaker of PC 104. In addition, softphone application 204 requests that sound card driver 201 start converting audio information from handset 100 to digital information and that audio client 202 start the detection for the first predefined phrase. When audio client 202 detects the first predefined phrase from sound card 103, it transmits control information to softphone application 204 indicating this fact. Softphone application 204 is responsive to the notification from audio client 202 that it has detected the predefined phrase to transmit a control message to PBX 107 via LAN card driver 203 indicating that the call has been answered. Softphone application 204 then interacts with PBX 107 to exchange the necessary control information so that the call can be completed. Softphone application 204 controls audio client 202 so that audio client 202 is responsive to digital samples received from LAN card driver 203 to relay these to sound card driver 201 and to relay digital samples received from sound card driver 201 to LAN card driver 203. When the predefined second phrase or sound from sound card 103 is detected by audio client 202, it signals this fact to softphone application 204. In response, softphone application 204 transmits a disconnect message to PBX 107 to cause the call to be terminated. If the user of telephone 109 hangs up on the call first, PBX 107 sends a disconnect message to softphone application 204 that resets the call state of the soft phone with respect to the software elements 201–204.

Figure 3:
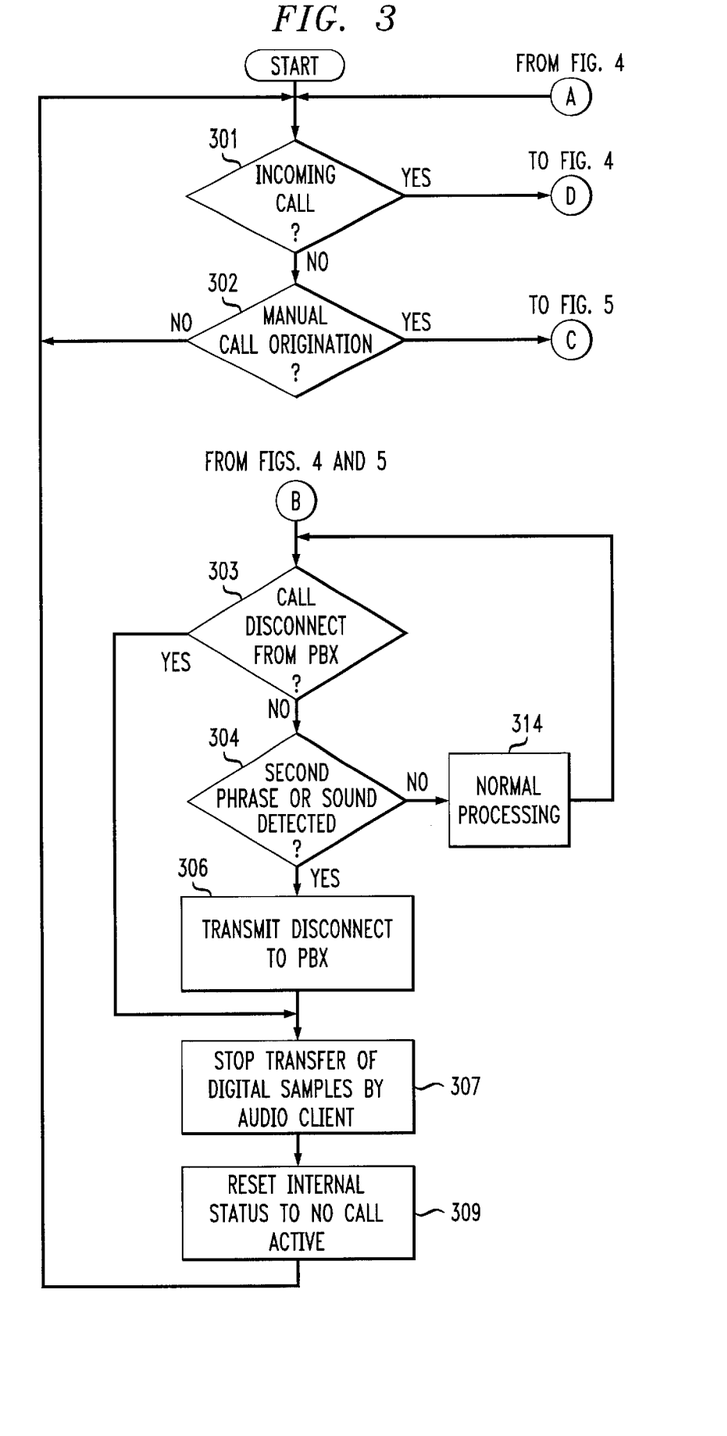
FIGS. 3–5 illustrate, in flowchart form, the steps performed by the software applications in implementing an embodiment of the invention.
Figure 4:
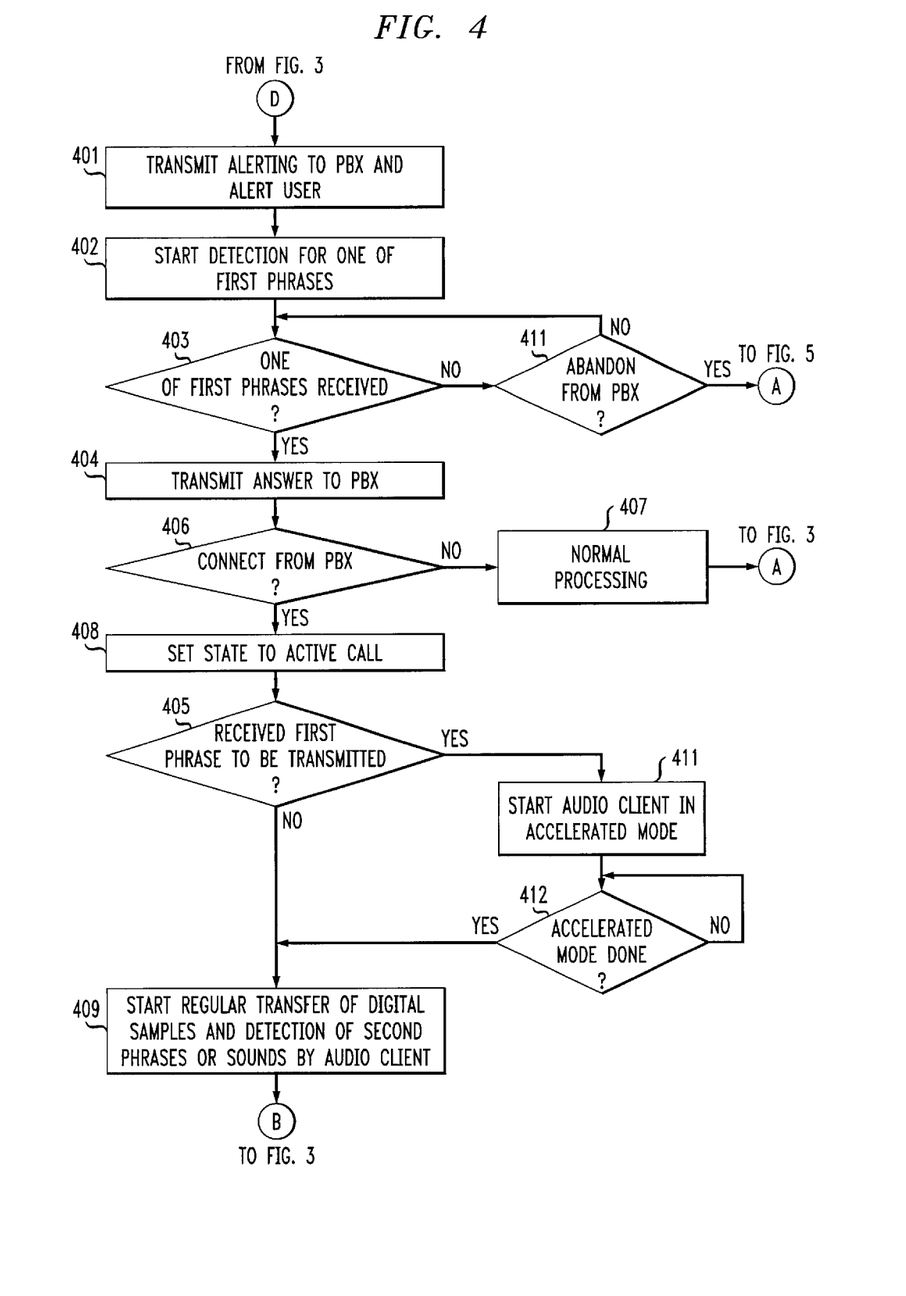
Figure 5:
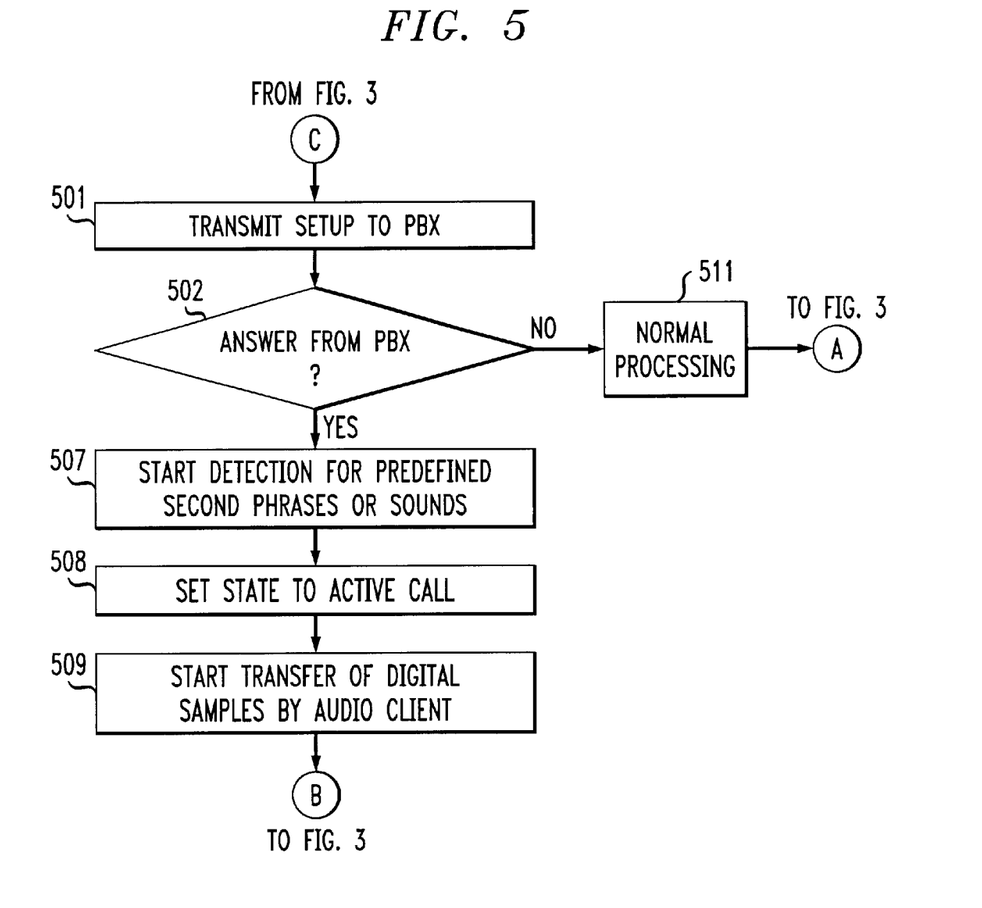

FIGS. 3–5 illustrate the operations performed by softphone application 204 in implementing an embodiment of the invention. Upon being started, decision block 301 checks to see if an incoming call is being received from PBX 107. If the answer is yes, control is transferred to block 401 of FIG. 4. The latter block transmits an alerting message back to PBX 107 and alerts the user of the softphone. Block 402 instructs audio client 202 to start the speech analysis to detect one of a plurality of first phrases that can be utilized by the user to answer the incoming call. Decision block 403 determines if one of the first phrases has been received by audio client 202. If the answer is no, decision block 411 determines if the PBX has abandon the call. If the answer is no, control is transferred back to decision block 403. If the answer in decision block 411 is yes, control is transferred back to decision block 301 of FIG. 3. If the answer is yes in decision block 403, block 404 transmits an answer message to PBX 107.

After execution of block 404, control is transferred to decision block 406 that determines whether or not a connect message has been received back from the PBX. If the answer is no, block 407 performs normal processing before returning control back to decision block 301 of FIG. 3. If a connect message has been received from PBX 107, block 408 sets the state of softphone application 204 and audio client 202 to the active call state before transferring control to decision block 405. Decision block 405 determines if the received first phrase that answered the incoming call is one that is to be transmitted to the calling party. If the answer is yes, block 411 instructs audio client 202 to enter the accelerated mode to transmit the received first phrase and any buffered subsequent speech to the calling party. In response, audio client application 202 starts to transmit the first phrase and subsequent speech from the user faster than the speech is being received by audio client application 202. This is done by using well known techniques such as eliminating a portion of silence interval between words or time domain harmonic scaling or other techniques known to those skilled in the art.

When all of the buffered speech has been transmitted, audio client application 202 signals softphone application 204. Decision block 412 determines when all of the received first phrase and buffered subsequent speech has been transmitted to the calling party. If the answer is no, decision block 412 is executed again. If the answer is yes, control is transferred to block 409. Block 409 instructs audio client 202 to start the regular transfer of digital samples to the calling party and to begin the speech analysis for the detection of the predefined second phrases or sounds so as to detect when the user wishes to end the incoming call before control is transferred back to decision block 303 of FIG. 3.

Returning to decision block 301, if the answer in decision block 301 is no indicating that an incoming call is not being received from PBX 107, decision block 302 determines if the user has indicated a manual call origination utilizing a softkey. If the answer is yes in decision block 302, this indicates that the user wishes originate a call and control is transferred to block 501 of FIG. 5. The latter block transmits a setup message to the PBX 107, and decision block 502 determines if an answer message is received back from PBX 107. If the answer is no in decision block 502, block 511 performs normal processing before transferring control back to decision block 301 of FIG. 3. If the answer in decision block 502 indicates that a call has been established, block 507 starts the detection by audio client 202 for detecting predefined second phrases or sounds, and block 508 sets the call state to active call. Finally, block 509 starts the transfer of digital samples by audio client 202 directly from audio transmitter 102 to PBX 107 before transferring control to decision block 301 of FIG. 3.

Returning to decision block 303 of FIG. 3, decision blocks 303 and 304 determine if a disconnect has been received from PBX 107 or if the user has disconnected, respectively. If a disconnect has been received from PBX 107, decision block 303 transfers control to block 307. If the answer is no in decision block 303, decision block 304 determines if the user has spoken one of the second phrases. If the answer is yes, control is transferred to block 306 that transmits a disconnect to PBX 107 before transferring control to block 307. Block 307 stops the transfer of digital samples by audio client 202. Finally, block 309 resets the internal status to no-call-active before transferring control back to decision block 301. If the answer in decision block 304 is no, control is transferred to block 314 that performs normal processing before returning control back to decision block 303.

Figure 6:
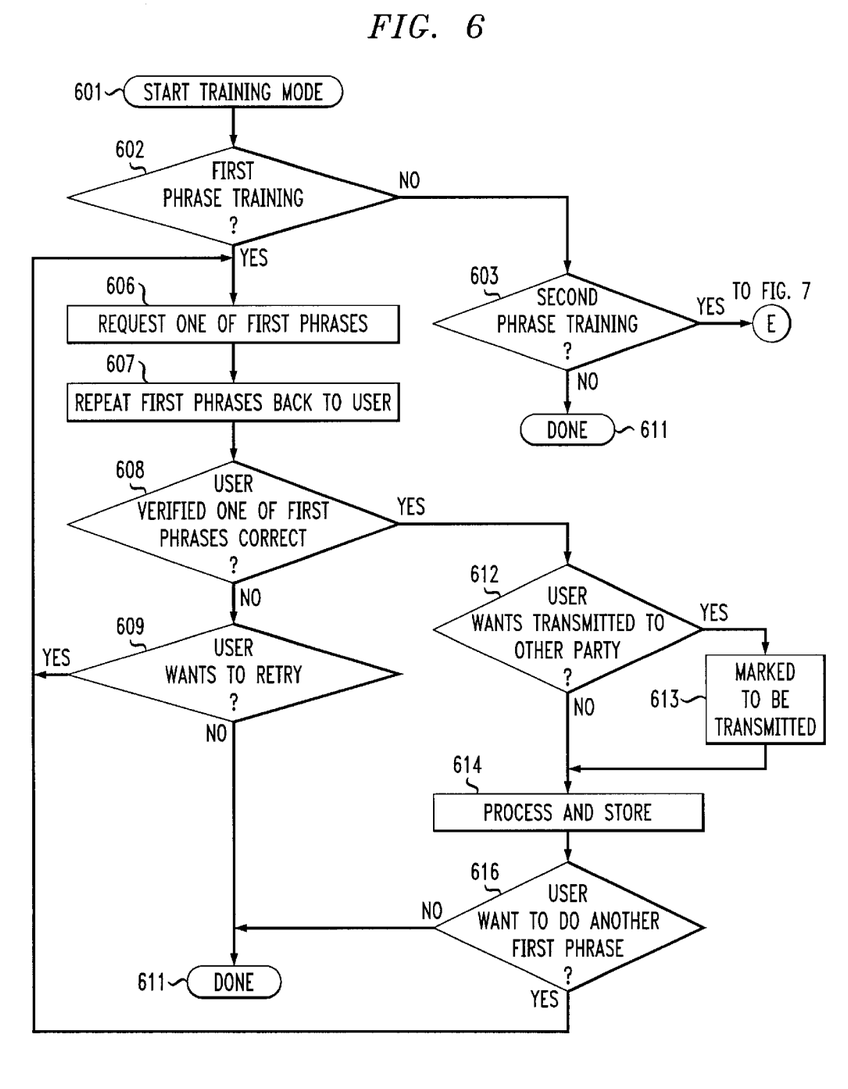
FIGS. 6 and 7 illustrate, in flowchart form, the steps performed by the software applications during the training for the first and second predefined phrases.
Figure 7:
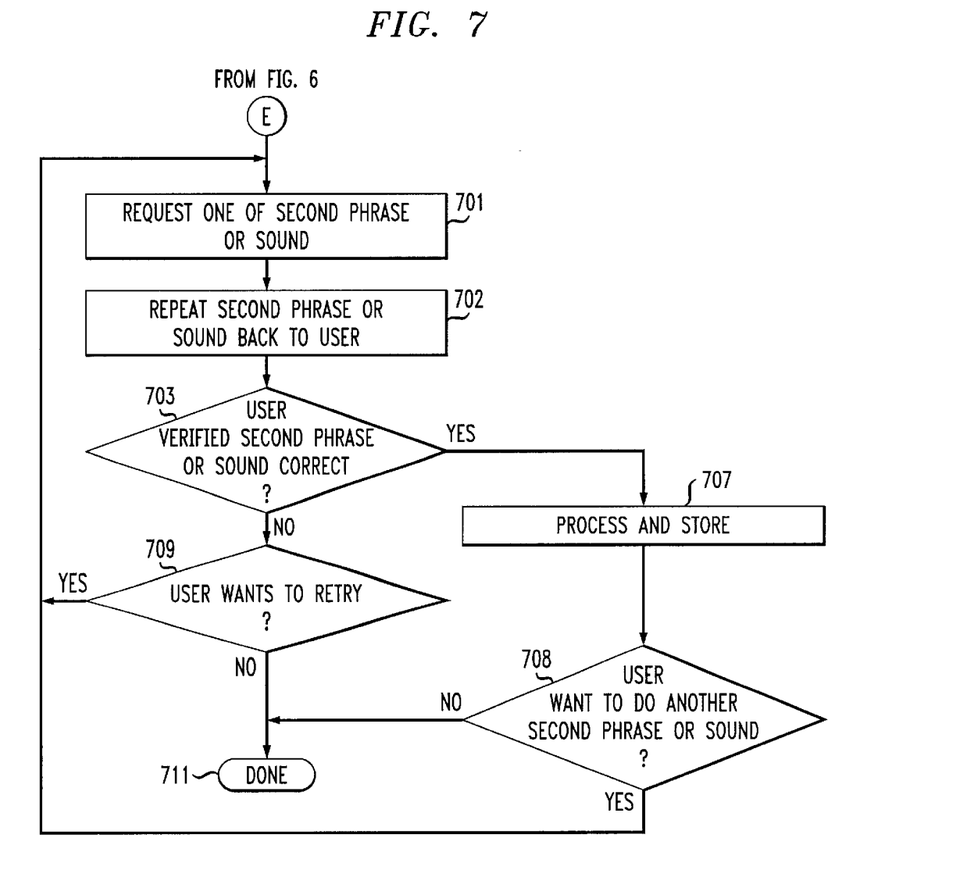

FIGS. 6 and 7 illustrate, in flowchart form, the steps performed to train audio client application 202 in the second embodiment for a plurality of first and second phrases. Once being started in block 601, decision block 602 determines if the training should be for first phrases. If the answer is no, control is transferred to decision block 603 which determines if training is to be done for second phrases. If the answer is yes, control is transferred to decision block 701 of FIG. 7. If the answer in block 603 is no, control is transferred to block 604, and the operations are terminated. Returning to decision block 602, if the answer is yes, control is transferred to block 606 which requested that the user speak one of the first phrases. Block 607 then repeats that one of the first phrases back to the user, and decision block 608 verifies that this is what the user meant to say. If it is the phrase that the user meant to say, control is transferred to decision block 612 that determines if the user wants this phrase transmitted to the other party. If the answer is yes, control is transferred to block 613 that marks the phrase as one to be transmitted to the other party before control is transferred to block 614. If the answer is no in block 612, control is transferred to block 614 that processes and stores the phrase. Decision block 616 then determines if the user wants to enter another first phrase. If the answer is no, control is transferred to block 611, and the operations are done. If the answer is yes in decision block 616, control is transferred back to decision block 606.

Returning to decision block 608, if the user indicates that the repeated phrase is not correct, control is transferred to decision block 609 that determines if the user wants to retry. If the answer is yes, control is transferred back to decision block 606. If the answer is no, control is transferred to block 611.

Returning to decision block 602, if the answer is no, control is transferred to block 701 of FIG. 7 which requested that the user speak one of the second phrases or create one of the predefined sounds. Block 702 then repeats that one of the second phrases back to the user, and decision block 703 verifies that this is what the user meant to say. If it is the phrase that the user meant to say, block 707 processes and stores the phrase or sound. Decision block 708 then determines if the user wants to enter another second phrase or predefined sound. If the answer is no, control is transferred to block 711, and the operations are done. If the answer is yes in decision block 708, control is transferred back to decision block 701.

Returning to decision block 703, if the user indicates that the repeated phrase or sound is not correct, control is transferred to decision block 709 that determines if the user wants to retry. If the answer is yes, control is transferred back to decision block 701. If the answer is no, control is transferred to block 711.

Of course, various changes and modifications to the illustrated embodiments described above will be apparent to those skilled in the art. Such changes and modifications can be made without departing from the spirit and scope of the invention and without diminishing its intended advantages. It is therefore, intended that such changes and modifications be covered by the following claims except insofar as limited by the prior art.

What is claimed is:

1. A method of determining call answer by an IP softphone that is implemented by a personal computer and including an audio transmitter, comprising the steps of:

receiving an incoming call from a telecommunication switching system;

detecting one of a plurality of first predefined speech phrases from the audio transmitter and spoken by a user of the IP softphone; and accepting the incoming call from the telecommunication switching system in response to the detection of the one of the plurality of first predefined speech phrases;

if the one of the plurality of first predefined speech phrases accepted the incoming call, then buffering the one of the plurality of first predefined speech phrases and a portion of subsequent speech in a buffer as buffered information;

accelerating removal of the buffered information from the buffer such that the removal is faster than speech is received from the audio transmitter; and transmitting the accelerated buffered information to the telecommunication switching system.

2. The method of claim 1 wherein the step of accelerating comprises eliminating a portion of silence intervals between words.

3. The method of claim 1 wherein the step of accelerating comprises using time domain harmonic scaling.

4. The method of claim 1 wherein the one of the plurality of first predefined speech phrases is user-independent.

5. The method of claim 1 wherein the one of the plurality of first predefined speech phrases is user-dependent.

6. The method of claim 1 further comprises the steps of detecting one of a plurality of predefined audio information segments from the audio transmitter; and disconnecting the incoming call from the telecommunication switching system in response to the detection of the one of the plurality of predefined audio information segments.

7. The method of claim 6 wherein the one of the plurality of predefined audio information segments is an user-independent predefined speech phrase.

8. The method of claim 6 wherein the one of the plurality of predefined audio information segments is an user-dependent second predefined speech phrase.

9. The method of claim 6 wherein the one of the plurality predefined audio information segments is a sound of a handset being placed in a stationary position.

10. The method of claim 8 wherein the one of the plurality predefined audio information segments is a sound of a headset being placed in a stationary position.

11. A method of determining call answer by an IP softphone that is implemented by a softphone application and an audio client application executing on a personal computer and including an audio transmitter, comprising the steps of:

receiving an incoming call from a telecommunication switching system;

detecting a first predefined speech phrase from the audio transmitter by the audio client application and spoken by a user of the IP softphone;

accepting the incoming call from the telecommunication switching system by the softphone application in response to the detection of the first predefined speech phrase;

buffering the first predefined speech phrase and a portion of subsequent speech in a buffer as buffered information;

accelerating removal of the buffered information from the buffer such that the removal is faster than speech is received from the audio transmitter;

transmitting the accelerated buffered information to a calling party;

detecting one of a sound of a headset or handset being placed in a stationary position from the audio transmitter by the audio client application; and disconnecting the incoming call from the telecommunication switching system by the softphone application in response to the detection of the sound.

12. The method of claim 11 wherein the step of accelerating comprises eliminating a portion of silence intervals between words.

13. The method of claim 11 wherein the step of accelerating comprises using time domain harmonic scaling.

14. The method of claim 11 wherein the first predefined speech phrase is user-independent.

15. The method of claim 11 wherein the first predefined speech phrase is user-dependent.

16. Apparatus for implementing the steps of claim 1.

17. Apparatus for implementing the steps of claim 11.

18. Apparatus for implementing the steps of claim 6.

* * * * *